United States Patent
Anderson et al.

(10) Patent No.: US 12,386,632 B2
(45) Date of Patent: Aug. 12, 2025

(54) SOFTWARE CONTROLLER GENERATION AND APPLICATION

(71) Applicant: Rakuten Mobile, Inc., Tokyo (JP)

(72) Inventors: Damien Anderson, Glasgow (GB); Paul Harvey, Glasgow (GB); Yusaku Kaneta, Tokyo (JP); Petros Papadopoulos, Glasgow (GB); Philip Rodgers, London (GB); Marc Roper, Glasgow (GB)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/245,545

(22) PCT Filed: Dec. 8, 2022

(86) PCT No.: PCT/US2022/052199
§ 371 (c)(1),
(2) Date: Mar. 16, 2023

(87) PCT Pub. No.: WO2024/123329
PCT Pub. Date: Jun. 13, 2024

(65) Prior Publication Data
US 2024/0427611 A1    Dec. 26, 2024

(51) Int. Cl.
*G06F 9/00*    (2018.01)
*G06F 9/24*    (2006.01)
*G06F 9/445*   (2018.01)
*G06F 15/177*  (2006.01)

(52) U.S. Cl.
CPC ................ *G06F 9/44505* (2013.01)

(58) Field of Classification Search
CPC .................................. G06F 9/44505
See application file for complete search history.

(56) References Cited

U.S. PATENT DOCUMENTS

| | | | |
|---|---|---|---|
| 10,936,046 B2 * | 3/2021 | Chao | G06F 1/3275 |
| 11,881,315 B1 * | 1/2024 | Soon-Shiong | G16H 50/30 |
| 2007/0112912 A1 | 5/2007 | Weber et al. | |
| 2010/0318911 A1 | 12/2010 | Holladay et al. | |

(Continued)

FOREIGN PATENT DOCUMENTS

WO    2022216694 A1    10/2022

*Primary Examiner* — Mohammed H Rehman
(74) *Attorney, Agent, or Firm* — HAUPTMAN HAM, LLP

(57) ABSTRACT

Software controllers are generated and applied by identifying a controllable parameter and a readable metric from a target entity, generating a software controller configured to determine a value of the controllable parameter based on the readable metric, receiving a first metric value corresponding to the readable metric, and applying a first controllable parameter value to the target entity, the first controllable parameter value produced by the software controller in response to input of the first metric value. Software controllers are generated by arranging a sequence of operations relating the controllable parameter to the readable metric, applying a plurality of genetic operators to the sequence to produce a plurality of offspring sequences, and determining whether each offspring sequence among the plurality of offspring sequences is fit for use as the software controller.

17 Claims, 8 Drawing Sheets

(56) References Cited

U.S. PATENT DOCUMENTS

| | | | |
|---|---|---|---|
| 2010/0318917 A1* | 12/2010 | Holladay | H04N 21/485 715/810 |
| 2018/0099409 A1 | 4/2018 | Meier et al. | |
| 2022/0039478 A1* | 2/2022 | Lavanchy | G06K 7/1413 |
| 2024/0068936 A1* | 2/2024 | Liu | G01N 21/718 |
| 2025/0118394 A1* | 4/2025 | Cronin | C40B 60/02 |

* cited by examiner

SOFTWARE CONTROLLER GENERATION AND APPLICATION

RELATED APPLICATIONS

The present application is a National Phase of International Application No. PCT/US2022/052199, filed Dec. 8, 2022.

BACKGROUND

Technical Field

This description relates to software controller generation.

Background

Large distributed systems are a common feature of the internet, and their management is an ongoing challenge that consumes time and resources. Automation has brought improvements to the area by increasing performance and reducing resource usage, and is now seen as an essential tool in meeting this challenge.

SUMMARY

According to at least some embodiments of the subject disclosure, software controllers are generated and applied by identifying a controllable parameter and a readable metric from a target entity, generating a software controller configured to determine a value of the controllable parameter based on the readable metric, receiving a first metric value corresponding to the readable metric, and applying a first controllable parameter value to the target entity, the first controllable parameter value produced by the software controller in response to input of the first metric value. Software controllers are generated by arranging a sequence of operations relating the controllable parameter to the readable metric, applying a plurality of genetic operators to the sequence to produce a plurality of offspring sequences, and determining whether each offspring sequence among the plurality of offspring sequences is fit for use as the software controller. Some embodiments include the instructions in a computer program, the method performed by the processor executing the instructions of the computer program, and an apparatus that performs the method. In some embodiments, the apparatus includes a controller including circuitry configured to perform the operations in the instructions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
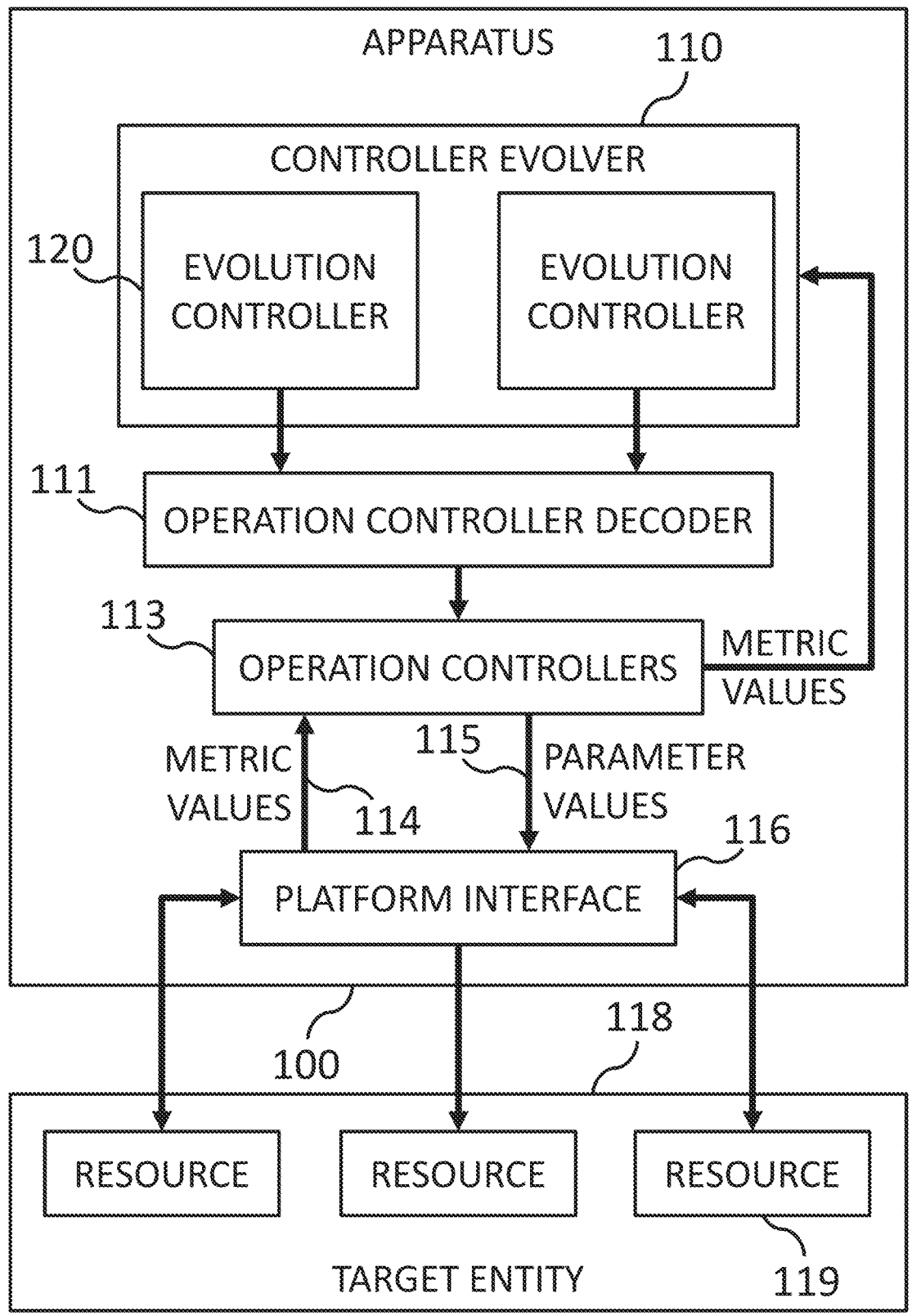
FIG. 1 is a schematic diagram of a system for software controller generation and application, according to at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Automation does not meet all demands, and the next step on is autonomy: giving the systems the ability to manage themselves. At least some embodiments include fully autonomous operation, such as systems which achieve OAM with little or no human involvement and possess the ability to self-optimise, self-configure, self-adapt, etc. In order to facilitate the shift from automation to autonomy, at least some embodiments of the subject disclosure utilize a hierarchy of evolutionary controllers. In at least some embodiments, the hierarchy allows for a divide-and-conquer approach where each controller down the hierarchy is responsible for a subset of the responsibilities of its parent. In at least some embodiments, the evolutionary aspect of the controllers allows for real-time behavioural adaptation to circumstances, and the production of optimal solutions that would be highly unlikely for human operators to create in a reasonable amount of time using a reasonable amount of resources.

In at least some embodiments, a mobile network controller is managed by software controller generation and application. In at least some embodiments, a hierarchy is charged with the task of continually monitoring the status of the mobile network controller, and, using evolutionary algorithms, modifying and adapting elements of the network controller, and the evolutionary hierarchy itself, if necessary, to respond to even unforeseeable problems, provide a consistent level of requisite service, and thereby achieve guided emergent behavior.

In at least some embodiments, a Content Delivery Network (CDN) is managed by software controller generation and application. Over 60% of the traffic on the internet is media content, such as images or streaming video. To reduce latency and provide high quality of service to users without linearly increasing network capacity, this content is often provided at edge servers in geographically distributed locations around the world. This reduces the latency of content access, as well as the load on backend, or origin, servers. This service is known as a CDN. Unlike cloud computing, which consists of relatively centralized resource-rich data centers, edge servers are more distributed and comparatively resource-constrained.

FIG. 1 is a schematic diagram of a system for software controller generation and application, according to at least some embodiments of the subject disclosure. The system includes an apparatus 100 and a target entity 118. Apparatus 100 includes a controller evolver 110, an operation controller decoder 111, operation controllers 113, and a platform interface 116. Target entity 118 includes a plurality of resources, such as resource 119.

Controller evolver 110 includes a plurality of evolution controllers, such as evolution controller 120. In at least some embodiments, each evolution controller is configured to generate a software controller configured to determine a value of a controllable parameter based on a readable metric. In at least some embodiments, the plurality of evolution controllers are configured to generate a plurality of software controllers including the software controllers of operation controllers 113, the plurality of software controllers collectively configured to determine values of a plurality of controllable parameters including the controllable parameters of parameter values 115 based on a plurality of readable metrics including the readable metrics of metric values 114. In at least some embodiments, each evolution controller is configured to produce sequences of operations fit for performance as an operation controller among operation controllers 113. In at least some embodiments where the target entity is a mobile network, evolution controller 120 is configured to produce three operation controllers dedicated to individual antenna tilt, each of which corresponds to a physical antenna in the network, and is responsible for adjusting the antenna tilt and feeding back data concerning coverage and interference. In at least some embodiments where the target entity is a mobile network, another evolution controller is configured to produce just one operation controller dedicated to controlling and measuring global antenna tilt, which will seek to optimize the coverage achieved by the cluster of antennae within its control.

Figure 5:
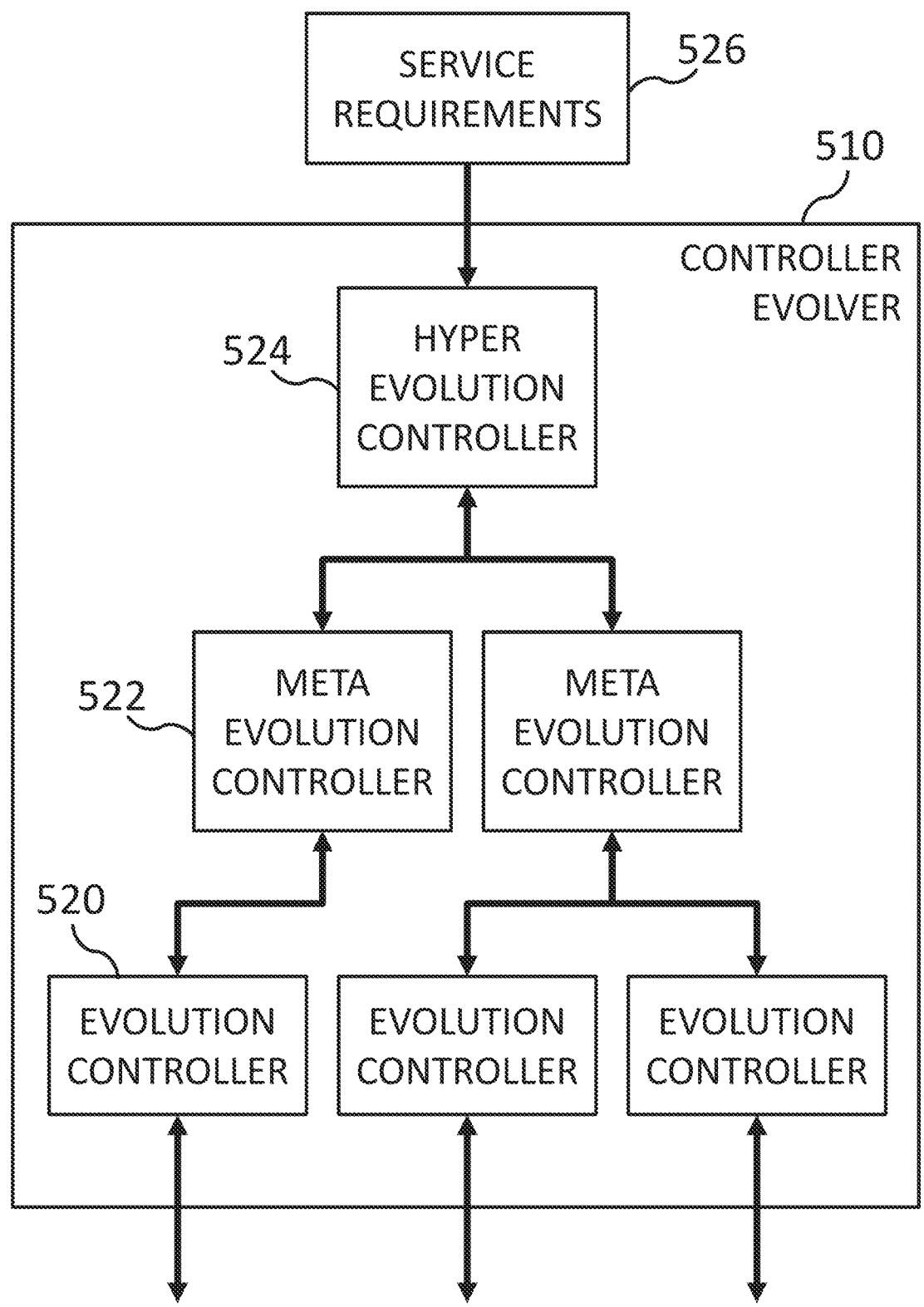
FIG. 5 is a schematic diagram of a software controller evolver, according to at least some embodiments of the subject disclosure.

In at least some embodiments, controller evolver 110 includes a hierarchy of evolution controllers. In at least some embodiments, the plurality of evolution controllers further includes a hyper evolution controller and a plurality of meta evolution controllers, such as shown in FIG. 5, which will be described hereinafter.

Operation controller decoder 111 is in communication with controller evolver. In at least some embodiments, operation controller decoder 111 is configured to convert software controllers into operation controllers 113. In at least some embodiments, operation controller decoder 111 is configured to decode a sequence of operations produced by evolution controller 120, the sequence of operations representing an encoded solution. In at least some embodiments, the operation controller decoder 111 performs genotype-to-phenotype mapping. In at least some embodiments, apparatus 100 includes operation controller decoder in order to avoid tainting the controller evolver with information specific to target entity 118 by decoding the solution produced by evolution controller 120.

Operation controllers 113 receive metric values 114 from platform interface 116 and transmit parameter values 115 to platform interface 116. In at least some embodiments, operation controllers 113 are configured to produce parameter values 115 in response to input of metric values 114. In at least some embodiments, operation controllers 113 are sequences of operations produced by controller evolver 120 and determined to be fit as operation controllers. In at least some embodiments, operation controllers 113 are the lowest-level part of the evolutionary system of controller evolver 100, and interact closely with particular resources, such as resource 119, within target entity 118. These resources, such as resource 119, correspond to physical components, such as an aerial, or less tangible features, such as mechanisms for shaping traffic flow in a mobile network. In at least some embodiments, operation controllers are configured to decode relevant parts of an encoded candidate solution for onward transmission to the target entity or resource thereof, thereby defining and deploying a particular configuration of the target entity. In at least some embodiments, operation controllers are configured to monitor the performance of target entity 118 of concern, and capture associated metrics for transmission back up the hierarchy to controller evolver 110. In at least some embodiments, operation controllers are configured to arrange or derive metrics for transmission back up the hierarchy to controller evolver 110 that are different from the readable metrics of metric values 114. In at least some embodiments, the number and nature of operation controllers 113 that sit beneath a single evolution controller varies dynamically with the characteristics of the evolved solution being evaluated. In at least some embodiments in which target entity 118 is a mobile network controller, if a candidate solution involves configuring seven antennae, then seven antenna-related operational controllers will be created and initialized by the corresponding evolution controller. In at least some embodiments, each evolution controller uses initialization parameters to configure the resources within their remit, such as the tilt of the various antennae, and also report back the performance metrics associated with these to controller evolver 110.

Platform interface 116 is in communication with target entity 119 and operation controller 113. In at least some embodiments, platform interface 116 is in communication with the plurality of resources of target entity 119. In at least some embodiments, platform interface 116 is configured to read metric values, such as metric values 114 from and apply controllable parameter values, such as controllable parameter values 115, to target entity 118 or the resources thereof. In at least some embodiments, for apparatus 100 to interact with, monitor, control and configure target entity 118, apparatus 100 interacts with numerous components of target entity 118, each of which might use different communication protocols or interfaces. In at least some embodiments, these components vary between target entities, and apparatus 100 is configured to be interoperable with different large scale target entities required to be configured in an optimal way. In at least some embodiments, platform interface 116 is configured to facilitate the interaction with target entity 118, and enable apparatus 100 to send messages in a standardized format, which are then translated into the appropriate commands for target entity 118 or the resources thereof, such as resource 119. In at least some embodiments, platform interface 116 is further configured to pass information back to apparatus 100, such as metric values 114 or resource availability and identification.

In at least some embodiments, platform interface 116 communicates with target entity 118 and the resources thereof through an Application Programming Interface (API), where metric values are received through GET requests, and parameter values are applied through POST requests. In at least some embodiments, platform interface 116 executes instances of target entity 118, applies parameter values through configuration files, and reads metric values from output streams or files.

In at least some embodiments, target entity 118 is a hardware system, a software system, or a system of both hardware and software. In at least some embodiments, target entity resources, such as resource 119, correspond to physical components or to less tangible features. In at least some embodiments, target entity resources output data usable as metrics. In at least some embodiments, metrics are identified from target entity resources through active monitoring by platform interface 116. In at least some embodiments in which target entity 118 is a mobile network operator, the resources, such as resource 119, includes individual antenna tilt mechanisms, global antenna tilt mechanisms, traffic throttles and other shapers, etc.

Figure 2:
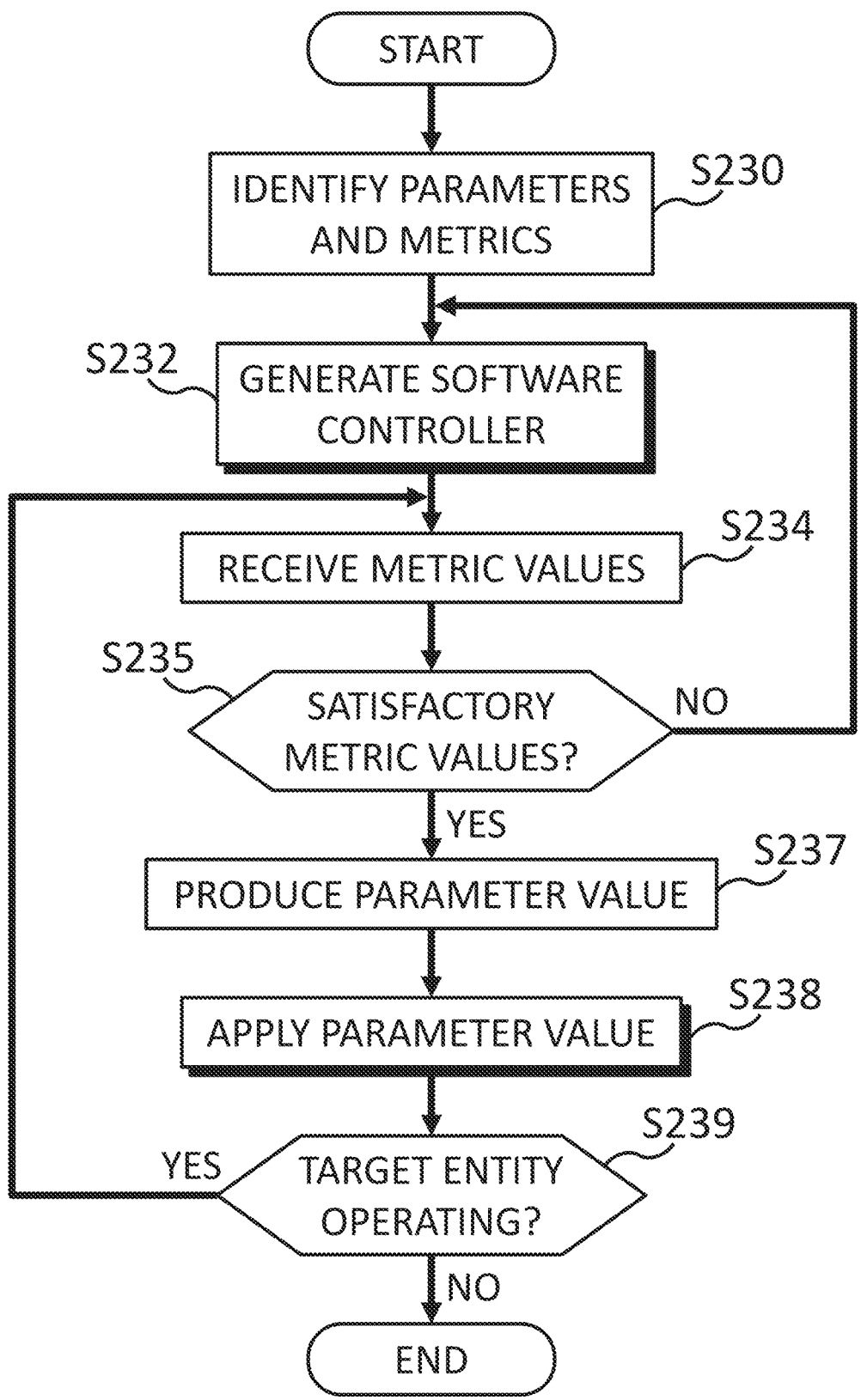
FIG. 2 is an operational flow for software controller generation and application, according to at least some embodiments of the subject disclosure.

FIG. 2 is an operational flow for software controller generation and application, according to at least some embodiments of the subject disclosure. The operational flow provides a method of software controller generation and application. In at least some embodiments, the method is performed by a controller of an apparatus including sections for performing certain operations, such as the controller and apparatus shown in FIG. 8, which will be explained hereinafter.

At S230, an identifying section identifies parameters and metrics of a target entity. In at least some embodiments, the identifying section identifies a controllable parameter and a readable metric from a target entity. In at least some embodiments, the identifying section identifies all controllable parameters and readable metrics within the domain of a target entity or resources thereof. In at least some embodiments in which the target entity is a mobile network operator, the readable metrics and controllable parameters both include antenna direction and antenna tilt. In at least some embodiments in which the target entity is a content delivery network, the readable metrics include average latency and controllable parameters include duration particular content is maintained in the local storage of an edge server. In at least some embodiments, in identifying the controllable parameter, the identifying section determines a value range within which the controllable parameter is adjustable. In at least some embodiments, in identifying the controllable parameter, the identifying section determines a value granularity at which the controllable parameter is adjustable. In at least some embodiments, the identifying section does not attempt to determine ranges or granularities during identifying, and instead relies on the evolution process to arrive at appropriate values anyway. In at least some embodiments, the identifying section identifies methods for reading values of each readable metric and for applying parameters values to each controllable parameter. In at least some embodiments, the identifying section embodies the identified methods into a platform interface, such as platform interface 116 of FIG. 1.

At S232, a generating section generates a software controller. In at least some embodiments, the generating section generates a software controller configured to determine a value of the controllable parameter based on the readable metric. In at least some embodiments, the generating section evolves software controllers, such as the operations of evolution controller 120 of FIG. 1. In at least some embodiments, the generating section performs the operational flow shown in FIG. 3, which will be explained hereinafter.

At S234, a receiving section receives metric values from the target entity. In at least some embodiments, the receiving section receives a first metric value corresponding to the readable metric. In at least some embodiments, the receiving section receives a second metric value corresponding to the readable metric in response to an applying section applying a first controllable parameter value at S238 in a previous iteration. In at least some embodiments, the receiving section submits GET requests to an API of the target entity or a resource thereof, such as the operations perform by platform interface 116 of FIG. 1.

At S235, the controller or a section thereof determines whether the metric values are satisfactory. In at least some embodiments, controller determines whether metric values are satisfactory in accordance with a fitness function. In at least some embodiments, the controller compares the second metric value, which was received in response to an applying section applying a first controllable parameter value at S238 in a previous iteration, to a second expected value of the fitness function. In at least some embodiments, the fitness function is a cost function, in that the fitness function relates metric values to a cost. In at least some embodiments, the controller determines that the metric values are not satisfactory in response to the cost surpassing a threshold cost value. In at least some embodiments, the controller determines that the metric values are not satisfactory in response to an average cost of a period of time or cycles surpassing a threshold cost value. If the controller determines that the metric values are not satisfactory, then the operational flow returns to software controller generation at S237. In at least some embodiments, the operational flow merely adopts another already generated software controller rather than repeat the software generation process entirely. In at least some embodiments, in response to the operational flow returning to S232, the generating section replaces the software controller with an offspring sequence among the plurality of offspring sequences determined to be fit for use as the software controller in response to the metric value deviating from an expected value by more than a threshold amount. If the controller determines that the metric values are satisfactory, then the operational flow proceeds to parameter value production at S237.

At S237, the controller or a section thereof produces a parameter value. In at least some embodiments, the controller causes the software controller to produce a controllable parameter value in response to input of one or more metric values. In at least some embodiments, the software controller produces a controllable parameter value in response to input of the metric values received in the current iteration of the operation at S234. In at least some embodiments, the software controller produces a controllable parameter value in response to input of the metric values received in one or more previous iterations of the operation at S234 instead of or in addition to the current iteration of the operation at S234.

At S238, the applying section applies a parameter value to the target entity. In at least some embodiments, the applying section applies a first controllable parameter value to the target entity, the first controllable parameter value produced by the software controller in response to input of the first metric value. In at least some embodiments, the applying section causes a platform interface, such as platform interface 116 of FIG. 1, to apply the parameter value to the target entity. In at least some embodiments, the applying section applies the parameter value to a particular resource of the target entity. In at least some embodiments, the identifying the controllable parameter at S230 and applying the first controllable parameter value at S238 is performed by a platform interface configured to convert controllable parameter values and readable metric values between a software controller format and a target entity format, such as platform interface 116 of FIG. 1.

At S239, the controller or a section thereof determines whether the target entity is still operating. If the controller determines that the target entity is still operating, then the operational flow returns to metric value reception at S234. If the controller determines that the target entity has ceased operation, then the operational flow ends.

Figure 3:
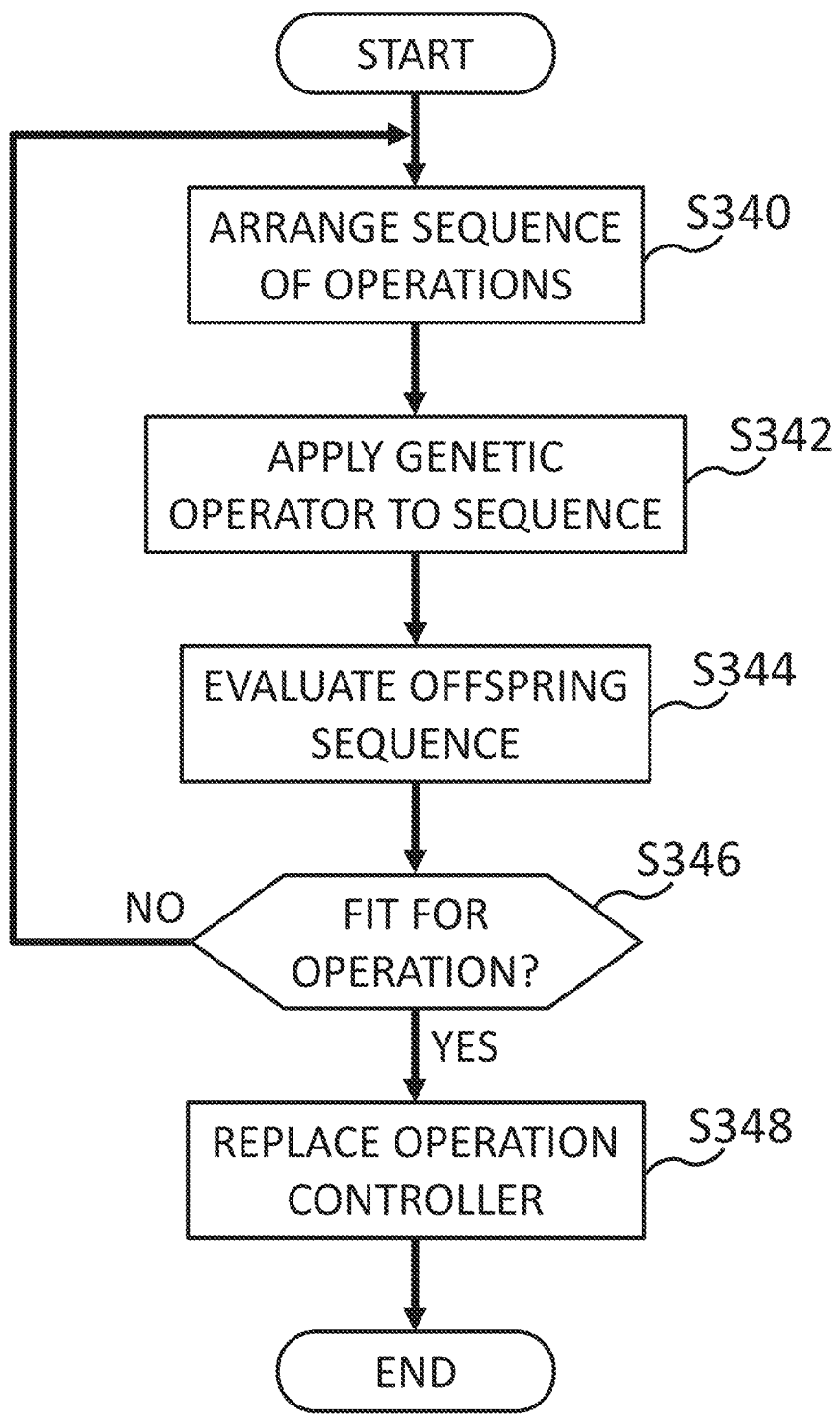
FIG. 3 is an operational flow for software controller generation, according to at least some embodiments of the subject disclosure.

FIG. 3 is an operational flow for software controller generation, according to at least some embodiments of the subject disclosure. The operational flow provides a method of software controller generation. In at least some embodiments, the method is performed by a generating section of an apparatus, such as the apparatus shown in FIG. 8, which will be explained hereinafter.

At S340, the generating section or a sub-section thereof arranges a sequence of operations. In at least some embodiments, the generating section arranges a sequence of operations relating the controllable parameter to the readable metric. In at least some embodiments, the sequence of operations has multiple inputs. In at least some embodiments, the sequence of operations includes operations performed in parallel. In at least some embodiments, the operations include mathematical operations, statistical analysis, metric value retrieval, or more complex operations.

At S342, the generating section or a sub-section thereof applies a genetic operator to the sequence of operations. In at least some embodiments, the genetic operator applies a plurality of genetic operators to the sequence to produce a new plurality of offspring sequences. In at least some embodiments, the genetic operator is a crossover, a mutation, etc. In at least some embodiments, the applying section applies multiple genetic operators in multiple ways to produce the plurality of offspring sequences.

At S344, the generating section evaluates the offspring sequence. In at least some embodiments, the generating section determining whether each offspring sequence among the plurality of offspring sequences is fit for use as the software controller. In at least some embodiments, the generating section applies test data to each offspring sequence, and determines whether the output is satisfactory. In at least some embodiments, the generating section uses each offspring sequence among the plurality of offspring sequences to process test data in a test environment to produce a test metric value. In at least some embodiments, the generating section uses a live environment during the test data processing, and the test data is live data. In at least some embodiments, the generating section uses a digital twin environment during the test data processing, and the test data is live data.

At S346, the generating section determines whether the offspring sequence is fit for operation. In at least some embodiments, the generating section compares the test metric value of each offspring sequence among the plurality of offspring sequences to a corresponding test expected value of a fitness function. In at least some embodiments, the generating section requires a variable level of fitness based on the fitness of a software controller currently used as the operation controller. In at least some embodiments, the generating section requires a level of fitness that is lower than the fitness of a software controller currently used as the operation controller, such as for later use in response to a change in environmental factors. If the generating section determines that the offspring sequence is not fit for operation, then the operational flow returns to sequence arrangement at S340. If the generating section determines that the offspring sequence is fit for operation, then the operational flow proceeds to operation controller replacement at S348. In at least some embodiments, the operational flow proceeds differently for individual offspring sequences.

At S348, the generating section replaces the operation controller. In at least some embodiments, the generating section replaces the software controller with an offspring sequence among the plurality of offspring sequences determined to be fit for use as the software controller. In at least some embodiments, the generating section does not replace the operation controller directly in response to determining that a sequence of operations is fit for operation.

Figure 4:
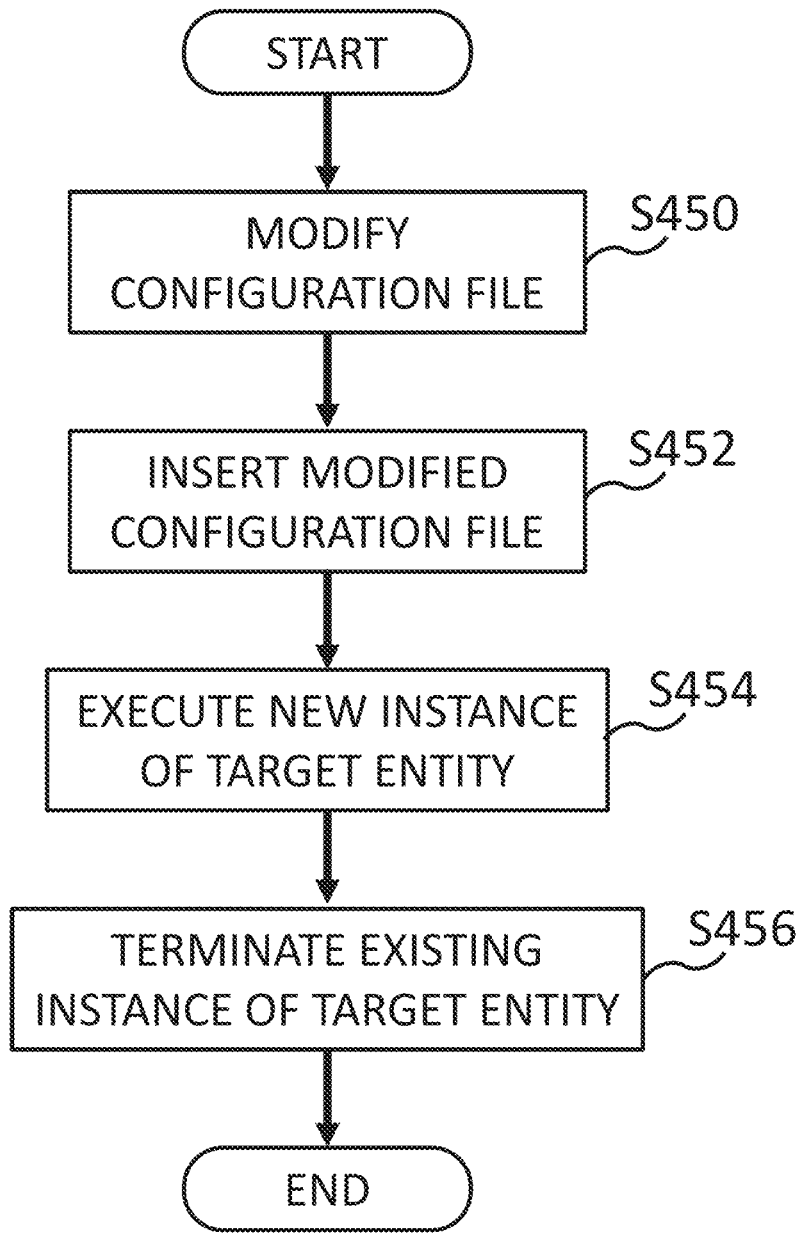
FIG. 4 is an operational flow for software controller application, according to at least some embodiments of the subject disclosure.

FIG. 4 is an operational flow for software controller application, according to at least some embodiments of the subject disclosure. The operational flow provides a method of software controller application. In at least some embodiments, the method is performed by an applying section of an apparatus, such as the apparatus shown in FIG. 8, which will be explained hereinafter.

At S450, the applying section or a sub-section thereof modifies a configuration file. In at least some embodiments, the applying section modifies a configuration file to include the controllable parameter value. In at least some embodiments, the applying section generates a new configuration file including the controllable parameter value.

At S452, the applying section or a sub-section thereof inserts the modified configuration file. In at least some embodiments, the applying section overwrites an existing configuration file with the modified configuration file. In at least some embodiments, the applying section creates a new instance of the executable code of the target entity, and places the modified configuration file in an appropriate logical location with respect thereto.

At S454, the applying section or a sub-section thereof executes a new instance of the target entity. In at least some embodiments, the applying section executes a new instance of the target entity with the configuration file. In at least some embodiments, the applying section opens a new container in a cloud computing environment to execute the new instance of the target entity.

At S456, the applying section or a sub-section thereof terminates an existing instance of the target entity. In at least some embodiments, the applying section closes an existing container in a cloud computing environment that is executing a current instance of the target entity.

FIG. 5 is a schematic diagram of a software controller evolver 510, according to at least some embodiments of the subject disclosure. Controller evolver 510 includes a plurality of evolution controllers, such as evolution controller 520, a plurality of meta evolution controllers, such as meta evolution controller 522, and a hyper evolution controller 524. In at least some embodiments, controller evolver 510 is used for controlling a mobile network according to a Service Level Agreement (SLA).

Hyper evolution controller 524 is configured to produce meta evolution controllers in response to input of one or more service requirements, such as service requirements 526. In at least some embodiments, hyper evolution controller 524 is configured to articulate an overall fitness function from a service requirement. In at least some embodiments, hyper evolution controller 524 is configured to monitor the apparatus as a whole to achieve a level of utility or fitness. In at least some embodiments, the level of utility or fitness is comparable to a service level agreement or a corporate strategy. In at least some embodiments, hyper evolution controller 524 is configured to decompose the overall fitness function into a plurality of fitness functions.

In at least some embodiments, hyper evolution controller 524 is configured to compose and monitor the meta evolution controllers, such as meta evolution controller 522. In at least some embodiments, hyper evolution controller 524 is configured to assign a meta fitness function among the plurality of fitness functions to each meta evolution controller. In at least some embodiments, hyper evolution controller 524 is configured to replace any meta evolution controller in response to output of the meta evolution controller deviating from expected output according to the overall fitness function.

Meta evolution controllers, such as meta evolution controller 522, are configured to compose and monitor low-level evolution controllers, such as evolution controller 520. In at least some embodiments, each meta evolution controller is assigned a fitness function decomposed by hyper evolution controller 524. In at least some embodiments, meta evolution controllers, such as meta evolution controller 522, are configured to assign a fitness function among the plurality of fitness functions to each evolution controller among the corresponding set of evolution controllers. In at least some embodiments, meta evolution controllers, such as meta evolution controller 522, are configured to replace any evolution controller among the corresponding set of evolution controllers in response to output of the evolution controller deviating from expected output according to the corresponding meta fitness function. In at least some embodiments, controller evolver 510 includes more than one layer of meta evolution controllers, wherein meta evolution controllers are configured to compose and monitor meta evolution controllers of the level immediately below.

The evolution controllers in FIG. 5, such as evolution controller 520, are substantially similar in structure in function to the evolution controllers in FIG. 1, except where indicated otherwise. In at least some embodiments, the hierarchy within controller evolver 510 is dynamic and flexible, and every evolution component at each level is independently running an autonomous evolutionary algorithm. In at least some embodiments, evolution controllers, such as evolution controller 520, may adopt or abandon software controllers as operation controllers in search of an optimal solution, and this pattern ripples up through the hierarchy so the same behaviors may be observed at the meta evolution controllers, such as meta evolution controller 522, and hyper evolution controller 524. In at least some embodiments, controller evolver 510 is based on a closed loop design, such as a Collect-Analyze-Decide-Act (CADA) or a Monitor-Analyze-Plan-Execute (MAPE) loop, that collects information about the target system and determines if the operation is at optimum level, and if not controller evolver 510 will select or create an appropriate configuration and deploy that configuration to the running target system. In at least some embodiments, every evolution controller at each level runs a similar loop, which monitors the performance of the components directly below it in the hierarchy and takes action as appropriate, such as by starting an evolutionary search for new parameter configurations or even new configurations of sub-components. In at least some embodiments, every evolution controller follows a similar basic template of being provided with a fitness function, building compositions of lower-level components down to the operation controllers, and running a control loop which collects metrics from corresponding sub-components and triggers an evolutionary search in response to the performance deviating too far from a specified level. In at least some embodiments, evolution controllers optimize respective fitness functions by searching for better parameters or configurations of corresponding sub-components.

Figure 6:
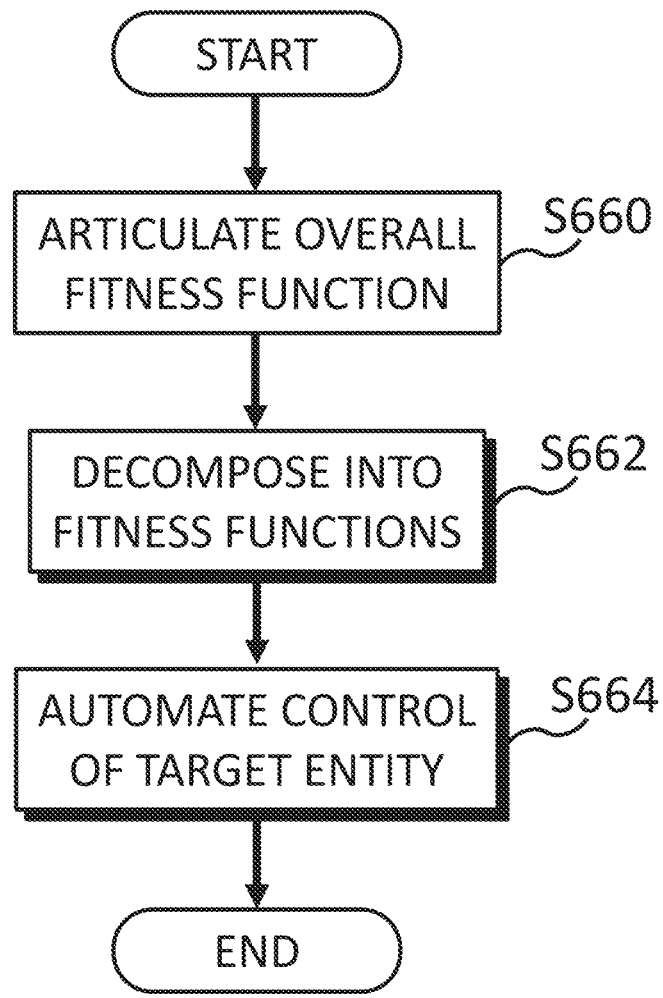
FIG. 6 is an operational flow for software controller evolver development, according to at least some embodiments of the subject disclosure.

FIG. 6 is an operational flow for software controller evolver development, according to at least some embodiments of the subject disclosure. The operational flow provides a method of software controller evolver development. In at least some embodiments, the method is performed by a controller of an apparatus, such as the controller and the apparatus shown in FIG. 8, which will be explained hereinafter.

At S660, the generating section or a sub-section thereof articulates an overall fitness function. In at least some embodiments, the generating section articulates an overall fitness function from a service requirement. In at least some embodiments, the generating section causes a hyper evolution controller, such as hyper evolution controller 524 of FIG. 5, to convert a service requirement into an overall fitness function of a target entity. In at least some embodiments, the generating section causes a hyper evolution controller, such as hyper evolution controller 524 of FIG. 5, to take as input high level goals from users articulated as fitness functions which are then decomposed into lower-level functions for use by meta and local evolutionary layers along with a set of resources, and aim to optimize the use of resources in response to changes in the environment, e.g. user requirements, usage patterns, system configuration, faults, etc. In at least some embodiments where the target entity is a mobile network, the generating section articulates an overall fitness function for optimizing the overall network performance and providing the requisite or optimal service, according to an SLA, to as many users as possible.

At S662, the generating section or a sub-section thereof decomposes the overall fitness function into a plurality of fitness functions. In at least some embodiments, the generating section decomposes the overall fitness function into a plurality of fitness functions, including the fitness function of each evolution controller, such as evolution controller 120 of FIG. 1. In at least some embodiments, the generating section performs the operational flow shown in FIG. 7, which will be explained hereinafter.

At S664, the controller or a section thereof automates control of the target entity. In at least some embodiments, the controller automates control of the target entity by performing the generating, the receiving, and the applying for each fitness function among the plurality of fitness functions. In at least some embodiments, the controller performs the operational flow shown in FIG. 2, explained above.

Figure 7:
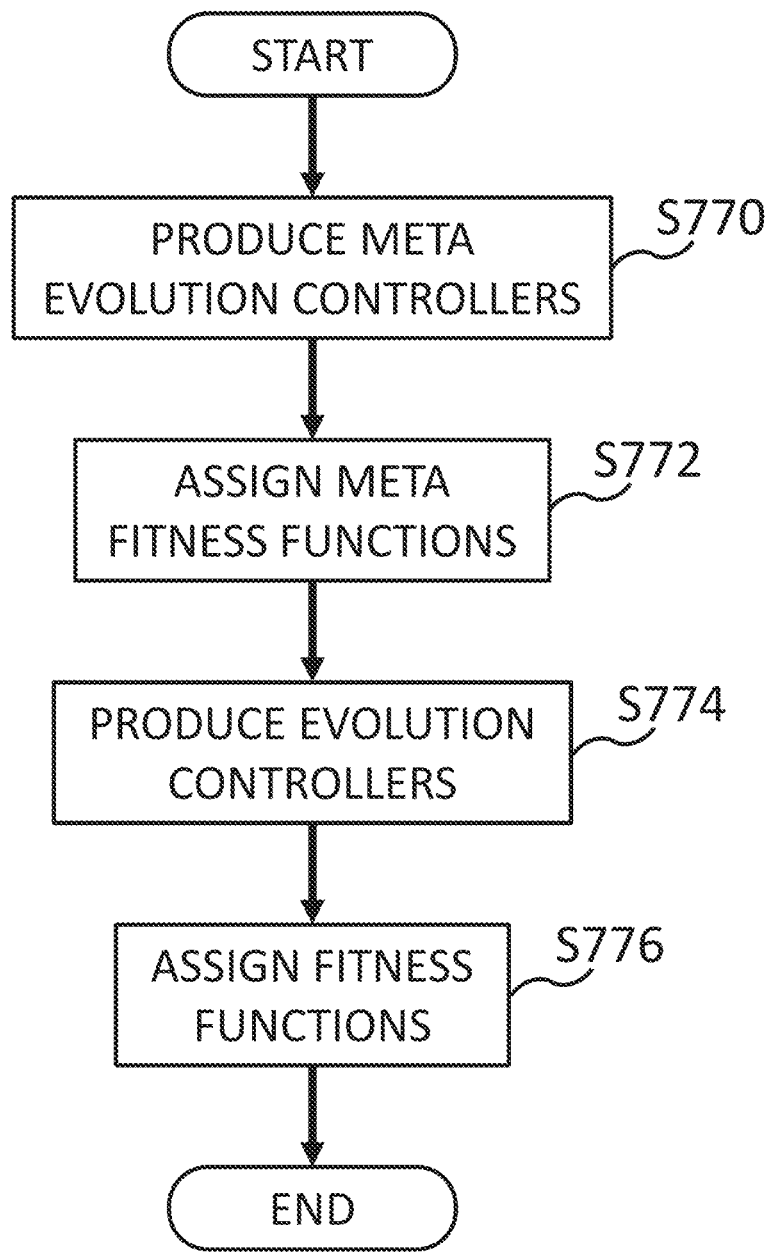
FIG. 7 is an operational flow for overall fitness function decomposition, according to at least some embodiments of the subject disclosure.

FIG. 7 is an operational flow for overall fitness function decomposition, according to at least some embodiments of the subject disclosure. The operational flow provides a method of overall fitness function decomposition. In at least some embodiments, the method is performed by a generating section of an apparatus, such as the apparatus shown in FIG. 8, which will be explained hereinafter.

At S770, the generating section or a sub-section thereof produces meta evolution controllers. In at least some embodiments, the generating section causes a hyper evolution controller, such as hyper evolution controller 522 of FIG. 5, to produce meta evolution controllers, such as meta evolution controller 522 of FIG. 5. In at least some embodiments, the generating section applies a hyper evolution controller, such as hyper evolution controller 524 of FIG. 5, to the overall fitness function to produce a plurality of meta evolution controllers. In at least some embodiments, the generating section produces meta evolution controllers configured to rely on a composition of evolution controllers dedicated to composing and optimizing the parameters of a number of operation controllers. In at least some embodiments where the target entity is a mobile network, the generating section causes the hyper evolution controller to employ the services of two meta evolution controllers, one dedicated to traffic shaping, and another dedicated to antennae tilt.

At S772, the generating section or a sub-section thereof assigns meta fitness functions. In at least some embodiments, the generating section causes a hyper evolution controller to assign a meta fitness function among the plurality of fitness functions to each meta evolution controller. In at least some embodiments where the target entity is a mobile network, the generating section causes the hyper evolution controller to assign to the meta evolution controller dedicated to antennae tilt, a meta fitness function with a goal of maximizing coverage and minimizing interference. In at least some embodiments where the target entity is a mobile network, the generating section causes the hyper evolution controller to assign to the meta evolution controller dedicated to traffic shaping, a meta fitness function with a goal of minimizing latency and maximizing bandwidth.

At S774, the generating section or a sub-section thereof produces evolution controllers. In at least some embodiments, the generating section causes meta evolution controllers, such as meta evolution controller 522 of FIG. 5, to produce evolution controllers, such as evolution controller 520 of FIG. 5. In at least some embodiments, the generating section applies each meta evolution controller, such as meta evolution controller 522 of FIG. 5, to the corresponding meta fitness function to produce a corresponding set of evolution controllers among the plurality of evolution controllers including evolution controller 520 of FIG. 5. In at least some embodiments where the target entity is a mobile network, the generating section causes the meta evolution controller dedicated to antennae tilt to produce an evolution controller associated with individual antenna tilt and an evolution controller associated with global antenna tilt.

At S776, the generating section or a sub-section thereof assigns fitness functions. In at least some embodiments, the generating section causes each meta evolution controller to assign a fitness function among the plurality of fitness functions to each evolution controller among the corresponding set of evolution controllers. In at least some embodiments where the target entity is a mobile network, the generating section causes the meta evolution controller dedicated to antennae tilt to assign, to the evolution controller associated with individual antenna tilt, a fitness function concerning individual coverage and interference. In at least some embodiments where the target entity is a mobile network, the generating section causes the meta evolution controller dedicated to antennae tilt to assign, to the evolution controller associated with global antenna tilt, a fitness function concerning global coverage and interference.

Figure 8:
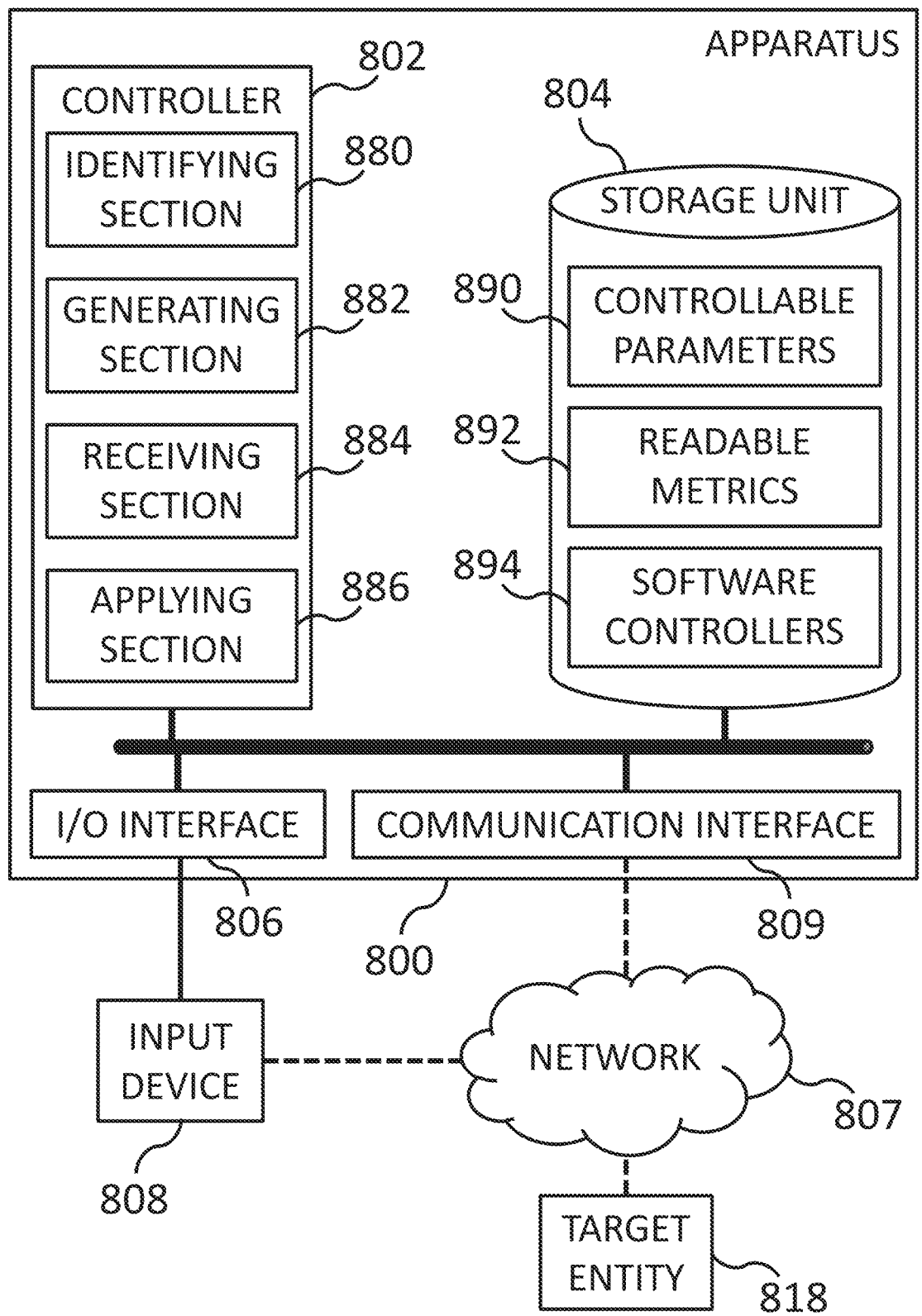
FIG. 8 is a block diagram of a hardware configuration for software controller generation and application, according to at least some embodiments of the subject disclosure.

FIG. 8 is a block diagram of a hardware configuration for software controller generation and application, according to at least some embodiments of the subject disclosure.

The exemplary hardware configuration includes apparatus 800, which interacts with input device 808, and communicates with target entity 818 through network 807. In at least some embodiments, apparatus 800 is a computer or other computing device that receives input or commands from input device 808. In at least some embodiments, apparatus 800 is integrated with input device 808. In at least some embodiments, apparatus 800 is a computer system that executes computer-readable instructions to perform operations for software controller generation and application.

Apparatus 800 includes a controller 802, a storage unit 804, an input/output interface 806, and a communication interface 809. In at least some embodiments, controller 802 includes a processor or programmable circuitry executing instructions to cause the processor or programmable circuitry to perform operations according to the instructions. In at least some embodiments, controller 802 includes analog or digital programmable circuitry, or any combination thereof. In at least some embodiments, controller 802 includes physically separated storage or circuitry that interacts through communication. In at least some embodiments, storage unit 804 includes a non-volatile computer-readable medium capable of storing executable and non-executable data for access by controller 802 during execution of the instructions. Communication interface 809 transmits and receives data from network 807. Input/output interface 806 connects to various input and output units, such as input device 808, via a parallel port, a serial port, a keyboard port, a mouse port, a monitor port, and the like to accept commands and present information. In some embodiments, storage unit 804 is external from apparatus 800.

Controller 802 includes identifying section 880, generating section 882, receiving section 884, and applying section 886. Storage unit 804 includes controllable parameters 890, readable metrics 892, and software controllers 894.

Identifying section 880 is the circuitry or instructions of controller 802 configured to identify controllable parameters and readable metrics. In at least some embodiments, identifying section 880 is configured to identify a controllable parameter and a readable metric from a target entity. In at least some embodiments, identifying section 880 records information in storage unit 804, such as controllable parameters 890 and readable metrics 892. In at least some embodiments, identifying section 880 includes sub-sections for performing additional functions, as described in the foregoing flow charts. In at least some embodiments, such sub-sections is referred to by a name associated with a corresponding function.

Generating section 882 is the circuitry or instructions of controller 802 configured to generate software controllers. In at least some embodiments, generating section 882 is configured to generate a software controller configured to determine a value of the controllable parameter based on the readable metric. In at least some embodiments, generating section 882 utilizes information in storage unit 804, such as controllable parameters 890 and readable metrics 892, and records information in storage unit 804, such as software controllers 894. In at least some embodiments, generating section 882 includes sub-sections for performing additional functions, as described in the foregoing flow charts. In at least some embodiments, such sub-sections is referred to by a name associated with a corresponding function.

Receiving section 884 is the circuitry or instructions of controller 802 configured to receive metric values. In at least some embodiments, receiving section 884 is configured to receive a first metric value corresponding to the readable metric. In at least some embodiments, receiving section 884 utilizes information from storage unit 804, such as readable metrics 892. In at least some embodiments, receiving section 884 includes sub-sections for performing additional functions, as described in the foregoing flow charts. In at least some embodiments, such sub-sections is referred to by a name associated with a corresponding function.

Applying section 886 is the circuitry or instructions of controller 802 configured to apply controllable parameter values. In at least some embodiments, applying section 886 is configured to apply a first controllable parameter value to the target entity, the first controllable parameter value produced by the software controller in response to input of the first metric value. In at least some embodiments, applying section 886 utilizes information from storage unit 804, such as software controllers 894. In at least some embodiments, applying section 886 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Accordingly, at least some embodiments of the subject disclosure include a non-transitory computer-readable medium including instructions executable by a processor to cause the processor to perform operations comprising: identifying a controllable parameter and a readable metric from a target entity; generating a software controller configured to determine a value of the controllable parameter based on the readable metric by: arranging a sequence of operations relating the controllable parameter to the readable metric, applying a plurality of genetic operators to the sequence to produce a plurality of offspring sequences, and determining whether each offspring sequence among the plurality of offspring sequences is fit for use as the software controller by using each offspring sequence among the plurality of offspring sequences to process test data in a test environment to produce a test metric value, and comparing the test metric value of each offspring sequence among the plurality of offspring sequences to a corresponding test expected value of a fitness function, receiving a first metric value corresponding to the readable metric; and applying a first controllable parameter value to the target entity, the first controllable parameter value produced by the software controller in response to input of the first metric value. In at least some embodiments, the operations further comprise: receiving a second metric value corresponding to the readable metric in response to applying the first controllable parameter value; comparing the second metric value to a second expected value of the fitness function; and replacing, in response to the second metric value deviating from the second expected value by more than a threshold amount, the software controller with an offspring sequence among the plurality of offspring sequences determined to be fit for use as the software controller. In at least some embodiments, the identifying the controllable parameter and applying the first controllable parameter value is performed by a platform interface configured to convert controllable parameter values and readable metric values between a software controller format and a target entity format. In at least some embodiments, the applying the first controllable parameter value to the target entity includes: modifying a configuration file to include the first controllable parameter value, executing a new instance of the target entity with the configuration file, and terminating an existing instance of the target entity. In at least some embodiments, the operations further comprise: articulating an overall fitness function from a service requirement; decomposing the overall fitness function into a plurality of fitness functions including the fitness function; and automating control of the target entity by performing the generating, the receiving, and the applying for each fitness function among the plurality of fitness functions. In at least some embodiments, the decomposing the overall fitness function includes: applying a hyper evolution controller to the overall fitness function to produce a plurality of meta evolution controllers, the hyper evolution controller configured to assign a meta fitness function among the plurality of fitness functions to each meta evolution controller, and replace any meta evolution controller in response to output of the meta evolution controller deviating from expected output according to the overall fitness function, and applying each meta evolution controller to the corresponding meta fitness function to produce a corresponding set of evolution controllers among the plurality of evolution controllers including the evolution controller, each meta evolution controller configured to assign a fitness function among the plurality of fitness functions to each evolution controller among the corresponding set of evolution controllers, and replace any evolution controller among the corresponding set of evolution controllers in response to output of the evolution controller deviating from expected output according to the corresponding meta fitness function, wherein the plurality of evolution controllers are configured to generate a plurality of software controllers including the software controller, the plurality of software controllers collectively configured to determine values of a plurality of controllable parameters including the controllable parameter based on a plurality of readable metrics including the readable metric. In at least some embodiments, the identifying the controllable parameter includes determining a value range within which the controllable parameter is adjustable. In at least some embodiments, the identifying the controllable parameter includes determining a value granularity at which the controllable parameter is adjustable.

At least some embodiments of the subject disclosure include a method comprising: identifying a controllable parameter and a readable metric from a target entity; generating a software controller configured to determine a value of the controllable parameter based on the readable metric by: arranging a sequence of operations relating the controllable parameter to the readable metric, applying a plurality of genetic operators to the sequence to produce a plurality of offspring sequences, and determining whether each offspring sequence among the plurality of offspring sequences is fit for use as the software controller by using each offspring sequence among the plurality of offspring sequences to process test data in a test environment to produce a test metric value, and comparing the test metric value of each offspring sequence among the plurality of offspring sequences to a corresponding test expected value of a fitness function, receiving a first metric value corresponding to the readable metric; and applying a first controllable parameter value to the target entity, the first controllable parameter value produced by the software controller in response to input of the first metric value. In at least some embodiments, the method further comprises receiving a second metric value corresponding to the readable metric in response to applying the first controllable parameter value; comparing the second metric value to a second expected value of the fitness function; and replacing, in response to the second metric value deviating from the second expected value by more than a threshold amount, the software controller with an offspring sequence among the plurality of offspring sequences determined to be fit for use as the software controller. In at least some embodiments, the identifying the controllable parameter and applying the first controllable parameter value is performed by a platform interface configured to convert controllable parameter values and readable metric values between a software controller format and a target entity format. In at least some embodiments, the applying the first controllable parameter value to the target entity includes: modifying a configuration file to include the first controllable parameter value, executing a new instance of the target entity with the configuration file, and terminating an existing instance of the target entity. In at least some embodiments, the method further comprises: articulating an overall fitness function from a service requirement; decomposing the overall fitness function into a plurality of fitness functions including the fitness function; and automating control of the target entity by performing the generating, the receiving, and the applying for each fitness function among the plurality of fitness functions. In at least some embodiments, the decomposing the overall fitness function includes: applying a hyper evolution controller to the overall fitness function to produce a plurality of meta evolution controllers, the hyper evolution controller configured to assign a meta fitness function among the plurality of fitness functions to each meta evolution controller, and replace any meta evolution controller in response to output of the meta evolution controller deviating from expected output according to the overall fitness function, and applying each meta evolution controller to the corresponding meta fitness function to produce a corresponding set of evolution controllers among the plurality of evolution controllers including the evolution controller, each meta evolution controller configured to assign a fitness function among the plurality of fitness functions to each evolution controller among the corresponding set of evolution controllers, and replace any evolution controller among the corresponding set of evolution controllers in response to output of the evolution controller deviating from expected output according to the corresponding meta fitness function, wherein the plurality of evolution controllers are configured to generate a plurality of software controllers including the software controller, the plurality of software controllers collectively configured to determine values of a plurality of controllable parameters including the controllable parameter based on a plurality of readable metrics including the readable metric. In at least some embodiments, the identifying the controllable parameter includes determining a value range within which the controllable parameter is adjustable. In at least some embodiments, the identifying the controllable parameter includes determining a value granularity at which the controllable parameter is adjustable.

At least some embodiments of the subject disclosure include an apparatus comprising: a controller including circuitry configured to identify a controllable parameter and a readable metric from a target entity; generate a software controller configured to determine a value of the controllable parameter based on the readable metric by: arranging a sequence of operations relating the controllable parameter to the readable metric, applying a plurality of genetic operators to the sequence to produce a plurality of offspring sequences, and determining whether each offspring sequence among the plurality of offspring sequences is fit for use as the software controller by using each offspring sequence among the plurality of offspring sequences to process test data in a test environment to produce a test metric value, and comparing the test metric value of each offspring sequence among the plurality of offspring sequences to a corresponding test expected value of a fitness function, receive a first metric value corresponding to the readable metric; and apply a first controllable parameter value to the target entity, the first controllable parameter value produced by the software controller in response to input of the first metric value. In at least some embodiments, the circuitry is further configured to receive a second metric value corresponding to the readable metric in response to applying the first controllable parameter value; compare the second metric value to a second expected value of the fitness function; and replace, in response to the second metric value deviating from the second expected value by more than a threshold amount, the software controller with an offspring sequence among the plurality of offspring sequences determined to be fit for use as the software controller. In at least some embodiments, the circuitry is further configured to, in applying the first controllable parameter value to the target entity, modify a configuration file to include the first controllable parameter value, execute a new instance of the target entity with the configuration file, and terminate an existing instance of the target entity. In at least some embodiments, the circuitry is further configured to articulate an overall fitness function from a service requirement; decompose the overall fitness function into a plurality of fitness functions including the fitness function; and automate control of the target entity by performing the generating, the receiving, and the applying for each fitness function among the plurality of fitness functions.

What is claimed is:

1. A non-transitory computer-readable medium including instructions executable by a processor to cause the processor to perform operations comprising:
   articulating an overall fitness function from a service requirement;
   decomposing the overall fitness function into a plurality of fitness functions; and
   automating control of a target entity by performing, for each fitness function among the plurality of fitness functions:
      identifying a controllable parameter and a readable metric from the target entity;
      generating a software controller configured to determine a value of the controllable parameter based on the readable metric by:
         arranging a sequence of operations relating the controllable parameter to the readable metric,
         applying a plurality of genetic operators to the sequence to produce a plurality of offspring sequences, and
         determining whether each offspring sequence among the plurality of offspring sequences is fit for use as the software controller by
            using each offspring sequence among the plurality of offspring sequences to process test data in a test environment to produce a test metric value, and
            comparing the test metric value of each offspring sequence among the plurality of offspring sequences to a corresponding test expected value of a fitness function among the plurality of fitness functions,
      receiving a first metric value corresponding to the readable metric; and
      applying a first controllable parameter value to the target entity, the first controllable parameter value produced by the software controller in response to input of the first metric value.

2. The computer-readable medium of claim 1, wherein automating control of the target entity includes further performing, for each fitness function among the plurality of fitness functions:

receiving a second metric value corresponding to the readable metric in response to applying the first controllable parameter value;

comparing the second metric value to a second expected value of the fitness function; and replacing, in response to the second metric value deviating from the second expected value by more than a threshold amount, the software controller with an offspring sequence among the plurality of offspring sequences determined to be fit for use as the software controller.

3. The computer-readable medium of claim 1, wherein the identifying the controllable parameter and applying the first controllable parameter value is performed by a platform interface configured to convert controllable parameter values and readable metric values between a software controller format and a target entity format.

4. The computer-readable medium of claim 1, wherein the applying the first controllable parameter value to the target entity includes:

modifying a configuration file to include the first controllable parameter value, executing a new instance of the target entity with the configuration file, and terminating an existing instance of the target entity.

5. The computer-readable medium of claim 1, wherein the decomposing the overall fitness function includes:

applying a hyper evolution controller to the overall fitness function to produce a plurality of meta evolution controllers, the hyper evolution controller configured to assign a meta fitness function among the plurality of fitness functions to each meta evolution controller, and replace any meta evolution controller in response to output of the meta evolution controller deviating from expected output according to the overall fitness function, and applying each meta evolution controller to the corresponding meta fitness function to produce a corresponding set of evolution controllers among the plurality of evolution controllers including the evolution controller, each meta evolution controller configured to assign a fitness function among the plurality of fitness functions to each evolution controller among the corresponding set of evolution controllers, and replace any evolution controller among the corresponding set of evolution controllers in response to output of the evolution controller deviating from expected output according to the corresponding meta fitness function, wherein the plurality of evolution controllers are configured to generate a plurality of software controllers including the software controller, the plurality of software controllers collectively configured to determine values of a plurality of controllable parameters including the controllable parameter based on a plurality of readable metrics including the readable metric.

6. The computer-readable medium of claim 1, wherein the identifying the controllable parameter includes determining a value range within which the controllable parameter is adjustable.

7. The computer-readable medium of claim 1, wherein the identifying the controllable parameter includes determining a value granularity at which the controllable parameter is adjustable.

8. A method comprising:

articulating an overall fitness function from a service requirement;

decomposing the overall fitness function into a plurality of fitness functions; and automating control of a target entity by performing, for each fitness function among the plurality of fitness functions:

identifying a controllable parameter and a readable metric from the target entity;

generating a software controller configured to determine a value of the controllable parameter based on the readable metric by:

arranging a sequence of operations relating the controllable parameter to the readable metric, applying a plurality of genetic operators to the sequence to produce a plurality of offspring sequences, and determining whether each offspring sequence among the plurality of offspring sequences is fit for use as the software controller by using each offspring sequence among the plurality of offspring sequences to process test data in a test environment to produce a test metric value, and comparing the test metric value of each offspring sequence among the plurality of offspring sequences to a corresponding test expected value of a fitness function among the plurality of fitness functions, receiving a first metric value corresponding to the readable metric; and applying a first controllable parameter value to the target entity, the first controllable parameter value produced by the software controller in response to input of the first metric value.

9. The method of claim 8, wherein automating control of the target entity includes further performing, for each fitness function among the plurality of fitness functions:

receiving a second metric value corresponding to the readable metric in response to applying the first controllable parameter value;

comparing the second metric value to a second expected value of the fitness function; and replacing, in response to the second metric value deviating from the second expected value by more than a threshold amount, the software controller with an offspring sequence among the plurality of offspring sequences determined to be fit for use as the software controller.

10. The method of claim 8, wherein the identifying the controllable parameter and applying the first controllable parameter value is performed by a platform interface configured to convert controllable parameter values and readable metric values between a software controller format and a target entity format.

11. The method of claim 8, wherein the applying the first controllable parameter value to the target entity includes:

modifying a configuration file to include the first controllable parameter value, executing a new instance of the target entity with the configuration file, and terminating an existing instance of the target entity.

12. The method of claim 8, wherein the decomposing the overall fitness function includes:

applying a hyper evolution controller to the overall fitness function to produce a plurality of meta evolution controllers, the hyper evolution controller configured to assign a meta fitness function among the plurality of fitness functions to each meta evolution controller, and replace any meta evolution controller in response to output of the meta evolution controller deviating from expected output according to the overall fitness function, and applying each meta evolution controller to the corresponding meta fitness function to produce a corresponding set of evolution controllers among the plurality of evolution controllers including the evolution controller, each meta evolution controller configured to assign a fitness function among the plurality of fitness functions to each evolution controller among the corresponding set of evolution controllers, and replace any evolution controller among the corresponding set of evolution controllers in response to output of the evolution controller deviating from expected output according to the corresponding meta fitness function, wherein the plurality of evolution controllers are configured to generate a plurality of software controllers including the software controller, the plurality of software controllers collectively configured to determine values of a plurality of controllable parameters including the controllable parameter based on a plurality of readable metrics including the readable metric.

13. The method of claim 8, wherein the identifying the controllable parameter includes determining a value range within which the controllable parameter is adjustable.

14. The method of claim 8, wherein the identifying the controllable parameter includes determining a value granularity at which the controllable parameter is adjustable.

15. An apparatus comprising:
a controller including circuitry configured to
articulate an overall fitness function from a service requirement;
decompose the overall fitness function into a plurality of fitness functions; and
automate control of a target entity with circuitry configured to, for each fitness function among the plurality of fitness functions:
identify a controllable parameter and a readable metric from the target entity;
generate a software controller configured to determine a value of the controllable parameter based on the readable metric by:
arranging a sequence of operations relating the controllable parameter to the readable metric,
applying a plurality of genetic operators to the sequence to produce a plurality of offspring sequences, and
determining whether each offspring sequence among the plurality of offspring sequences is fit for use as the software controller by
using each offspring sequence among the plurality of offspring sequences to process test data in a test environment to produce a test metric value, and
comparing the test metric value of each offspring sequence among the plurality of offspring sequences to a corresponding test expected value of a fitness function among the plurality of fitness functions,
receive a first metric value corresponding to the readable metric; and
apply a first controllable parameter value to the target entity, the first controllable parameter value produced by the software controller in response to input of the first metric value.

16. The apparatus of claim 15, wherein the circuitry is further configured to, for each fitness function among the plurality of fitness functions:
receive a second metric value corresponding to the readable metric in response to applying the first controllable parameter value;
compare the second metric value to a second expected value of the fitness function; and
replace, in response to the second metric value deviating from the second expected value by more than a threshold amount, the software controller with an offspring sequence among the plurality of offspring sequences determined to be fit for use as the software controller.

17. The apparatus of claim 15, wherein the circuitry is further configured to, in applying the first controllable parameter value to the target entity,
modify a configuration file to include the first controllable parameter value,
execute a new instance of the target entity with the configuration file, and
terminate an existing instance of the target entity.

* * * * *